United States Patent [19]

Roulleau

[11] Patent Number: 5,142,976

[45] Date of Patent: Sep. 1, 1992

[54] MACHINE FOR PRINTING A POULTRY EGG

[75] Inventor: Pierre Roulleau, Oyonnax, France

[73] Assignee: Oeuromer S.A., Luxembourg-Kirchberg, France

[21] Appl. No.: 650,904

[22] Filed: Feb. 5, 1991

[30] Foreign Application Priority Data

Feb. 16, 1990 [FR] France ............... 90 01887

[51] Int. Cl.⁵ ............................. B41F 17/30
[52] U.S. Cl. ..................... 101/41; 101/163; 101/407.1; 426/87; 426/383
[58] Field of Search ............ 101/163, 35, 41, 44, 101/475, 407.1; 426/383, 87

[56] References Cited

U.S. PATENT DOCUMENTS

| | | | |
|---|---|---|---|
| 1,369,570 | 2/1921 | Stiles | 101/35 |
| 1,400,124 | 12/1921 | Wolverton | 1013/35 |
| 2,002,698 | 5/1935 | Kruczek | 101/35 |
| 3,299,804 | 1/1967 | Schueler | 101/35 |

FOREIGN PATENT DOCUMENTS

| | | | |
|---|---|---|---|
| 34372 | 9/1970 | Australia . | |
| 69038 | 1/1983 | European Pat. Off. . | |
| 3516016 | 11/1986 | Fed. Rep. of Germany . | |
| 788432 | 2/1935 | France . | |
| 2531664 | 2/1984 | France . | |
| 0166544 | 7/1988 | Japan | 101/35 |
| 1134630 | 11/1968 | United Kingdom . | |

*Primary Examiner*—Clifford D. Crowder
*Attorney, Agent, or Firm*—Pearne, Gordon, McCoy & Granger

[57] ABSTRACT

Machine for printing uncooked poultry eggs wherein a decorative motif is affixed to the shell. The motif comprises continuous parts printed by tampography and extending at least over two arcs of ellipse which are perpendicular to one another, each being more than 2 cm in length.

8 Claims, 1 Drawing Sheet

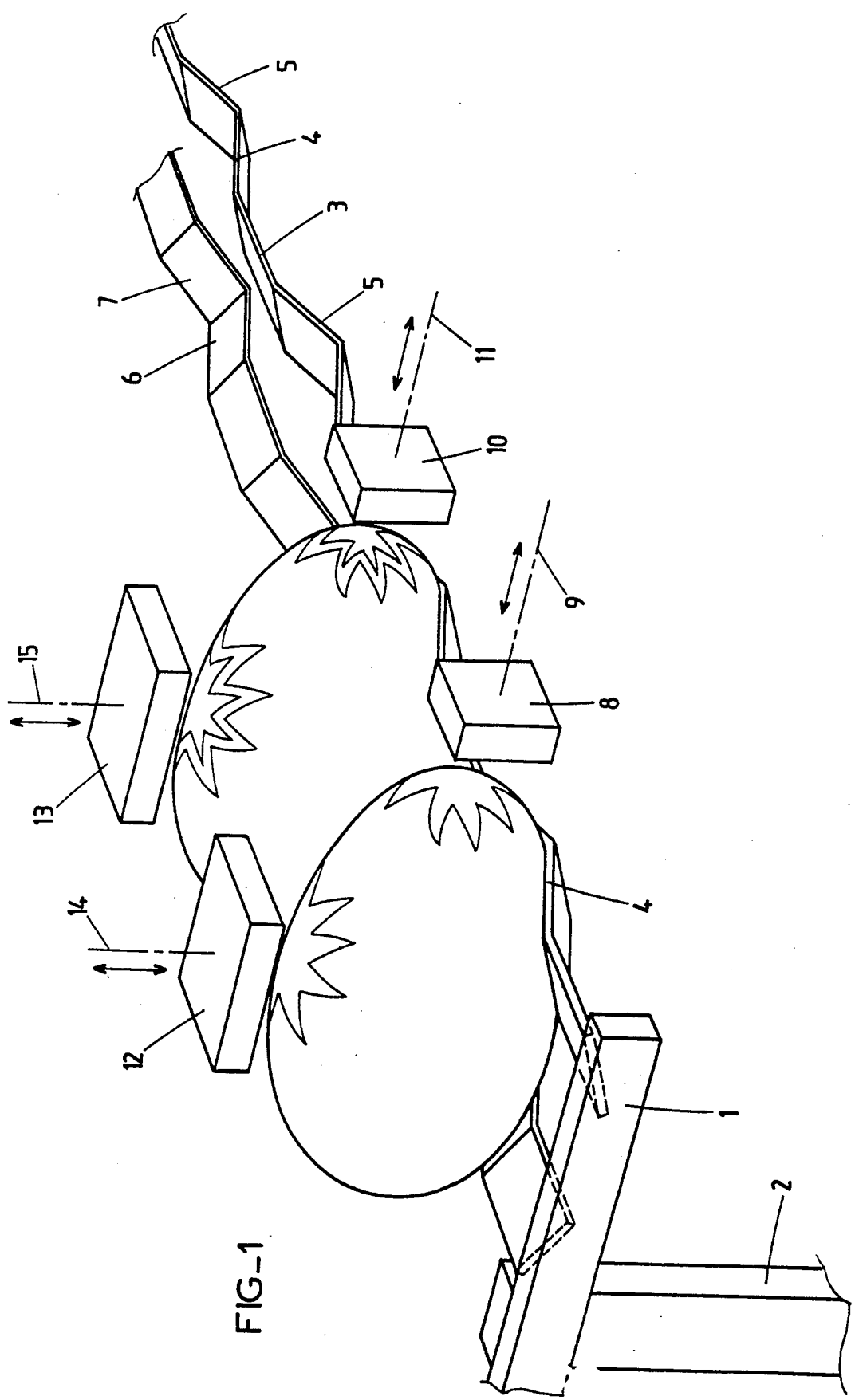
FIG_1

MACHINE FOR PRINTING A POULTRY EGG

The present invention concerns uncooked poultry eggs, in particular hens' eggs, to the shells of which there are affixed large-sized, decorative motifs, as well as printing machines enabling motifs of this type to be affixed to eggs.

Affixing decorative motifs to an egg by flexographic printing, by the use of engraved, concave rubber blocks (DE-A-35 16 016), is already known. However, these processes are not suitable for the clear application of an advertisement or a large-sized decorative motif in several colours to the non-developable shell of the egg, all the more so since the curves differ from one egg to another, even with eggs of the same size. The parts of the block in relief are not matched correctly to the non-developable surface of the egg. In U.S. Pat. No. 4,843,958, an ink jet process without contact is proposed. This process has the advantage of removing the risk of breaking the eggs during printing, but it has the serious drawback that the motifs obtained are not continuous, because they are formed by a succession of punctual spots which, when printing on a curved surface of the egg and in particular at the ends, are not even of the same size and shape, since the shell is not planar.

The invention overcomes these drawbacks by a process which enables good-quality, large-sized decorative motifs to be affixed even to the most curved parts of the shell. The process enables an uncooked poultry egg to be obtained, to the shell of which there is affixed a decorative motif with two perpendicular dimensions which are perpendicular one another, each having a length of arc of ellipse of at least 2 cm, but which comprises continuous parts such as those printed by tampography. Tampography consists in applying a slightly convex flexible inking pad, or tampon, which has previously received the motif to be printed, to the object to be decorated. The motif is engraved in a cross shape in a plate, generally made of steel. This plate, known as a block, is first uniformly covered with ink then cleaned by the passage of a scraper similar to a razor blade, which allows the ink to remain only in the hollow of the engraving. The inking pad is first applied to the block, where it takes up the ink corresponding to the motif, then to the object, where it deposits it. The process can be used without alteration to the quality of the printing, even if the inking pad has large dimensions and is very non-rigid. Under these conditions it can be deformed without difficulty to match the surface of the egg over a large extent, without the need for excessive pressure to be applied. The motif can be extended notably over the very curved ends of the egg and, in particular, over the small end, which is very difficult to make accessible on a conventional support where the egg is placed with its axis vertical, and the motif can be extended simultaneously, if desired, over the lateral surface of the egg. The motif is of one, or preferably several colours. A single inking pad can serve to print eggs of different shapes.

The machine according to the invention comprises a support for the egg to be printed, a first inking pad for printing by tampography and a first mechanism for placing the inking pad in contact with the egg on the support and for moving it away. The support comprises two pairs of facets. Each facet is inclined in relation to the vertical, moving away from the vertical from the bottom to the top at an angle of between 20° and 70°. The facets of each pair form between them an angle of between 60° and 120°. The distance between two facets of the same pair is less than the smallest dimension, in horizontal projection, of the egg, and the distance between two facets of two different pairs is less than the largest dimension, in horizontal projection, of the egg, there being in particular from 25 to 50 mm between the centres of the facets. The first inking pad is displaced by the first mechanism in a horizontal direction substantially along the plane bisecting the dihedral formed by one of the pairs of facets.

Due to this particular support with 4 facets which define a stable position for the egg, whatever its shape and size, the inking pads for printing by tampography can be applied to the egg resting on this support with its axis horizontal, to the upward-turned lateral surface and/or to one or both ends, without displacing it, so that two inking pads can be applied successively to obtain two different colours at the same place on the egg, for example by causing the egg, still held on its support, to pass before two stations with different patterns, and without breaking it under the force of applying the inking pads, since these facets are arranged so that they do not cause the egg to be pierced. Several eggs of different shapes and sizes can be placed successively on the same support without breaking the eggs and while keeping them exactly in position, which is a decisive advantage for the industrial use of this machine.

In contrast to the complicated machine described in FR-A-788 432, in which spoons partly cover the zones to be printed, the entire upper lateral surface of the egg placed on the support is free, which allows room for a second inking pad for printing by tampography, associated with a second mechanism for placing it in contact with the egg on the support, this second inking pad being displaced by the second mechanism in the vertical direction, so that it can print both the end of the egg and the lateral surface of the egg, over a very large area. The lateral surface and the top ends can even be printed at the same time.

Advantageously, the facets are planar.

According to an advantageous embodiment, the support extends below the egg practically only outside the contour of the egg, with the exception of the facets. If an already cracked egg breaks during printing, the liquid part flows away below the printing machine; it is not necessary to stop the machine in order to clean it before restarting operations.

In the attached drawing, shown solely by way of example,

FIG. 1 is a perspective view illustrating the invention.

Extending between two crosspieces 1 carried by two vertical members 2, there are two undulating side members 3 forming the support for a row of eggs for printing, these side members being arranged on the support with their axis of revolution horizontal. Each cell of the support comprises two pairs of facets 4, 5 and 6, 7. Each facet is inclined in relation to the vertical, moving away from the vertical from the bottom to the top. The facets 4 and 5 of each pair form between them an angle of 90°. The distance between two facets of the same pair 4, 5 is less than the smallest dimension, in horizontal projection, of the egg. The distance between two facets 4, 6 of two different pairs is less than the largest dimension, in horizontal projection, of the egg. A first inking pad 8 for printing by tampography is displaced by a first mechanism, comprising a screw jack 9, in a horizontal direction substantially along the plane bisecting the dihedral formed by the facets 6 and 7, which merges with that of the dihedral formed by the facets 4 and 5. At another station, another first inking pad 10 is displaced by a screw jack 11 and is inked with a different colour to that of the inking pad 8.

Similarly, the second inking pads 12 and 13 for printing by tampography, displaced by the screw jacks 14 and 15 in the vertical direction, enable the upper lateral surface of the egg to be printed.

The egg which is obtained has a motif printed by tampography in several colours extending over two arcs of ellipse perpendicular one another, each being more than 2 cm in length.

I claim:

1. Machine for printing eggs comprising a support for the egg to be printed, a first inking pad for printing by tampography and a first mechanism for placing the inking pad in contact with the egg on the support and for moving it away, wherein the support comprises two pairs of facets, each facet being inclined in relation to the vertical, moving away from the vertical from the bottom to the top, and the facets of each pair forming between them an angle of between 60° and 120°, the distance between two facets of the same pair being less than the smallest dimension, in horizontal projection, of an egg, and the distance between two facets of two different pairs being less than the largest dimension, in horizontal projection, of an egg, and substantially only the facets of the support extend below the egg, said facets supporting said egg at spaced locations along its contour and defining an opening below the egg between said locations, the first inking pad being displaced by the first mechanism in a substantially horizontal direction, along the plane bisecting the dihedral formed by one of the pairs of facets.

2. The machine of claim 1, wherein each of said facets comprises a planar element having a planar surface for supporting eggs.

3. The machine of claim 2, wherein each pair of facets comprises a pair of said planar elements connected together.

4. The machine of claim 3, wherein a first plurality of said pairs of planar elements are connected together to provide a first undulating side member and a second plurality of said pairs of planar elements are connected together to provide a second undulating side member, said first side member being spaced from said second side member for supporting eggs therebetween in associated different pairs of said pairs of planar elements provided by said first and second side members.

5. The machine of claim 1, wherein two facets of the same pair are inclined to the vertical by between 20° and 70°.

6. The machine of claim 1, wherein the distance between two facets of two different pairs is between 25 and 50 mm.

7. The machine of claim 1, for printing by tampography, in which a second inking pad is associated with a second mechanism for placing it in contact with the egg on the support, the second inking pad being displaced by the second mechanism in the vertical direction.

8. The machine of claim 1, wherein the facets are plane.

* * * * *